May 13, 1958    H. W. CHAPMAN ET AL    2,834,304
FREIGHT LOADING APPARATUS

Filed Sept. 21, 1954          10 Sheets-Sheet 2

INVENTORS.
Harvey W. Chapman
Henry L. Dunlap
BY
Harness, Dickey & Pierce
ATTORNEYS May 13, 1958  H. W. CHAPMAN ET AL  2,834,304
FREIGHT LOADING APPARATUS
Filed Sept. 21, 1954  10 Sheets-Sheet 3
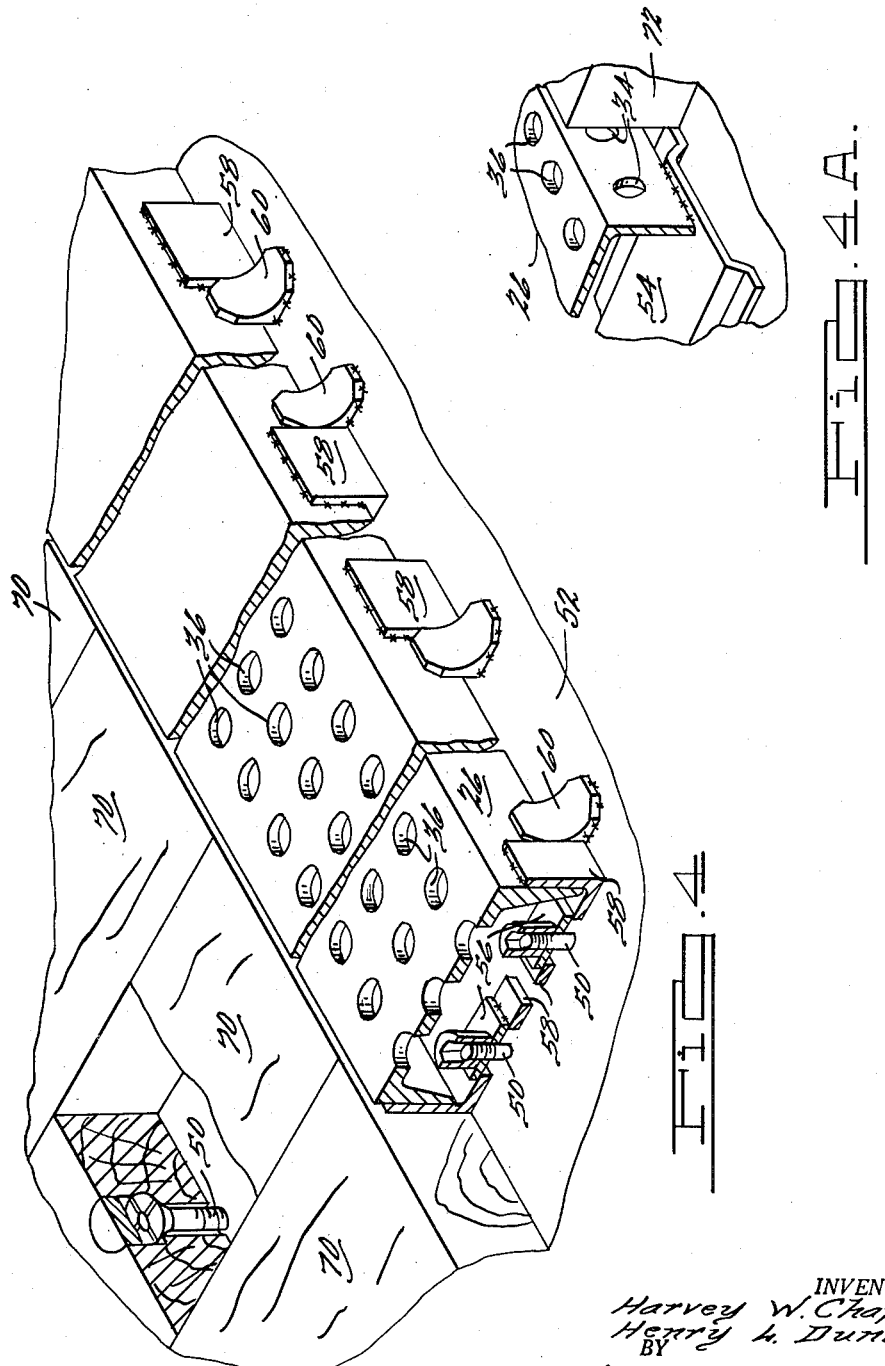
INVENTORS.
Harvey W. Chapman
Henry L. Dunlap
BY
Harness, Dickey & Pierce.
ATTORNEYS

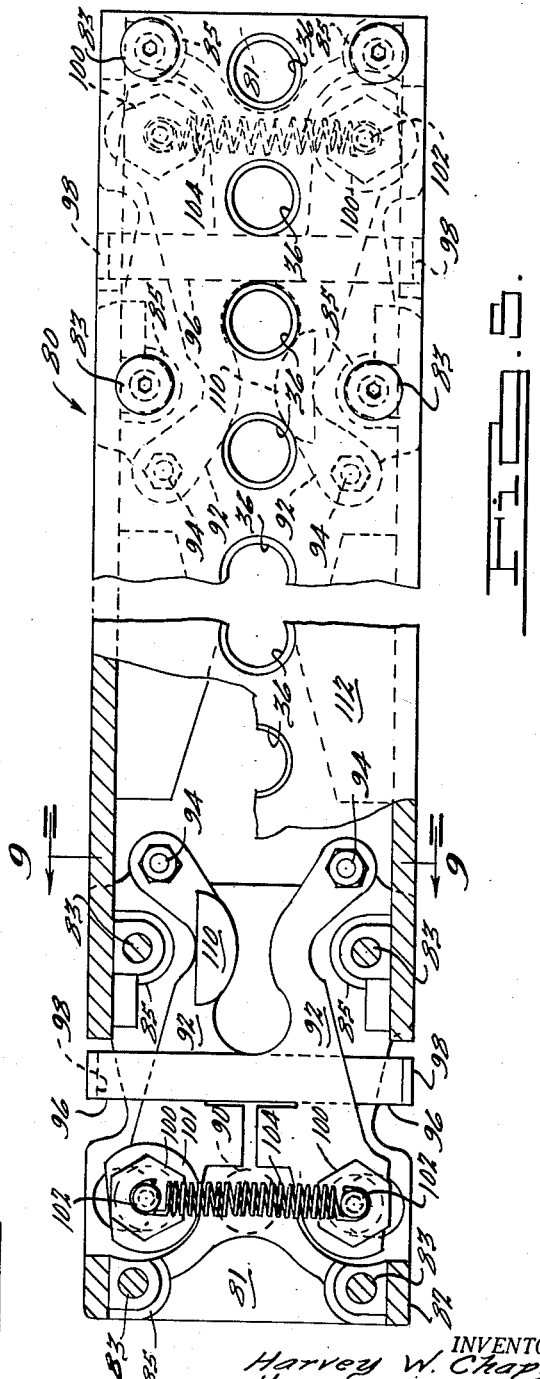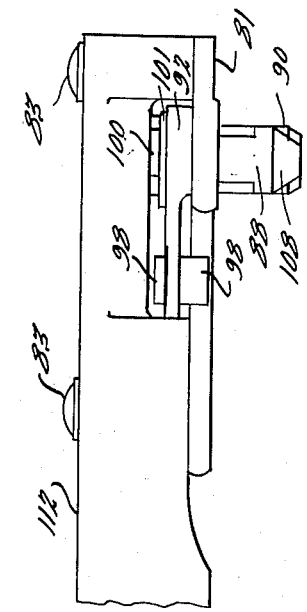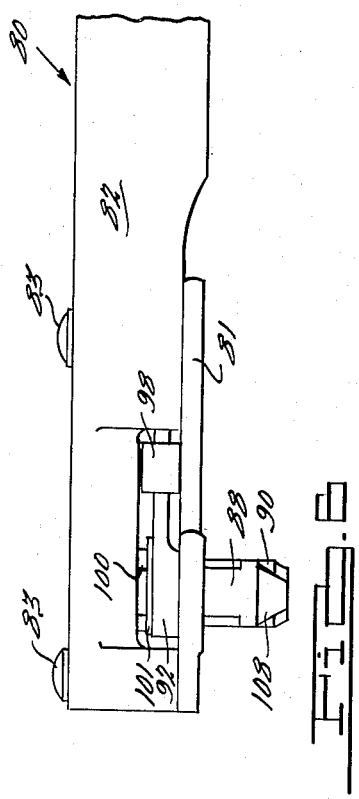

May 13, 1958    H. W. CHAPMAN ET AL    2,834,304
FREIGHT LOADING APPARATUS
Filed Sept. 21, 1954      10 Sheets-Sheet 5
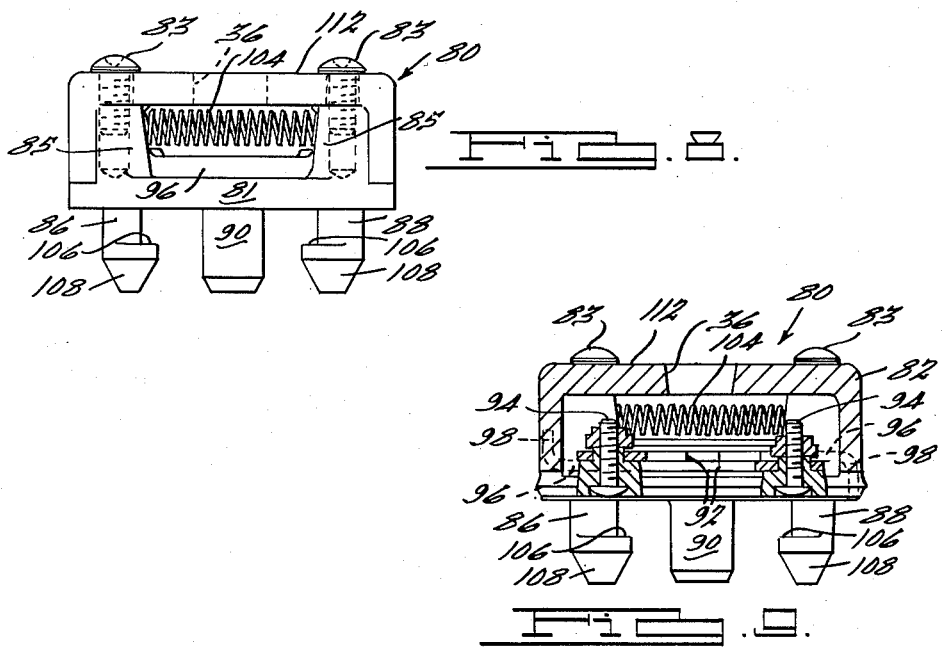
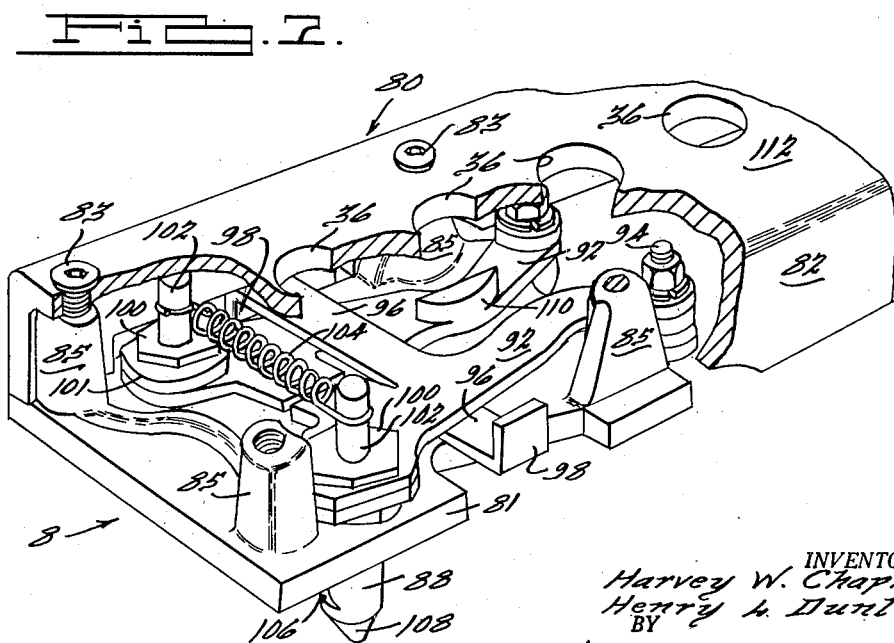
INVENTORS
Harvey W. Chapman
Henry L. Dunlap
BY
Harness, Dickey & Pierce
ATTORNEYS

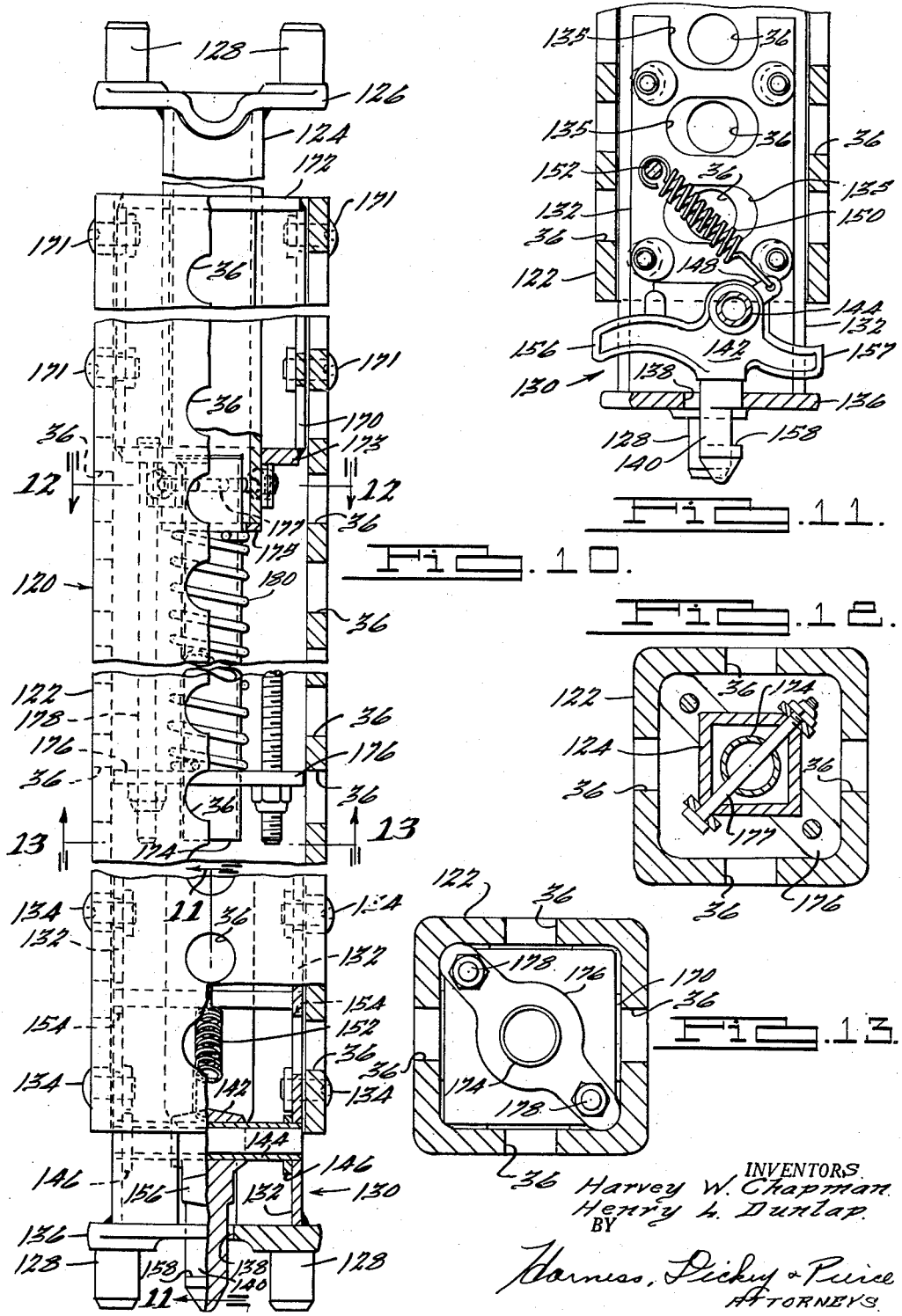

May 13, 1958 H. W. CHAPMAN ET AL 2,834,304
FREIGHT LOADING APPARATUS
Filed Sept. 21, 1954 10 Sheets-Sheet 7
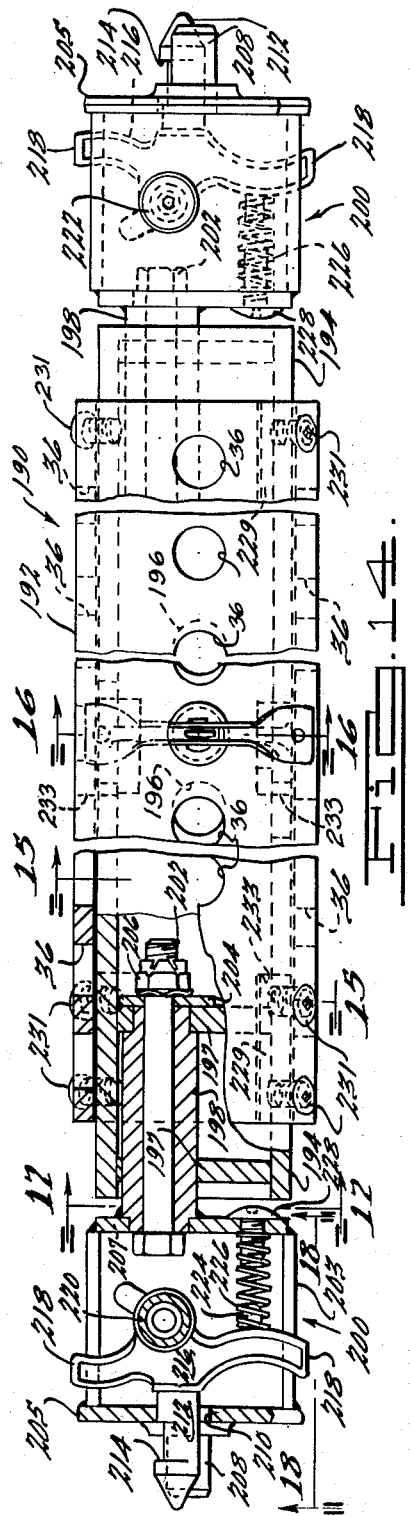
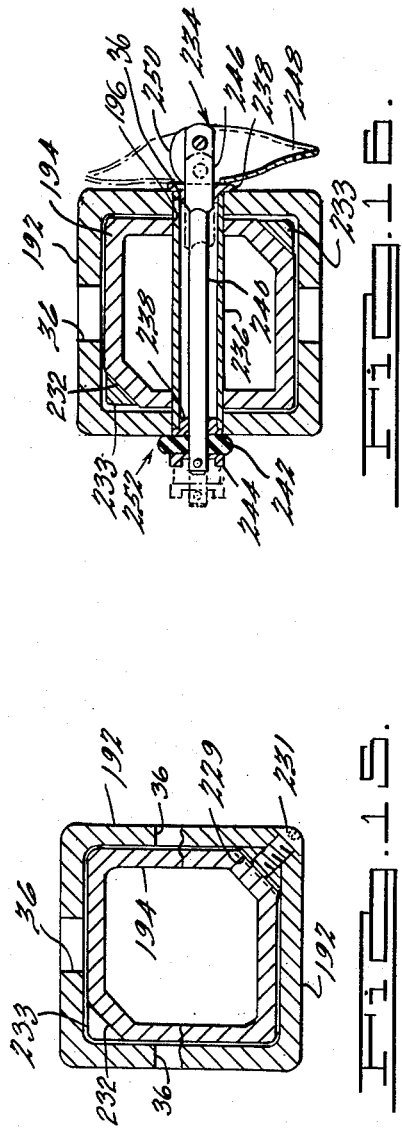
INVENTORS
Harvey W. Chapman
Henry L. Dunlap
BY
Harness, Dickey & Pierce
ATTORNEYS

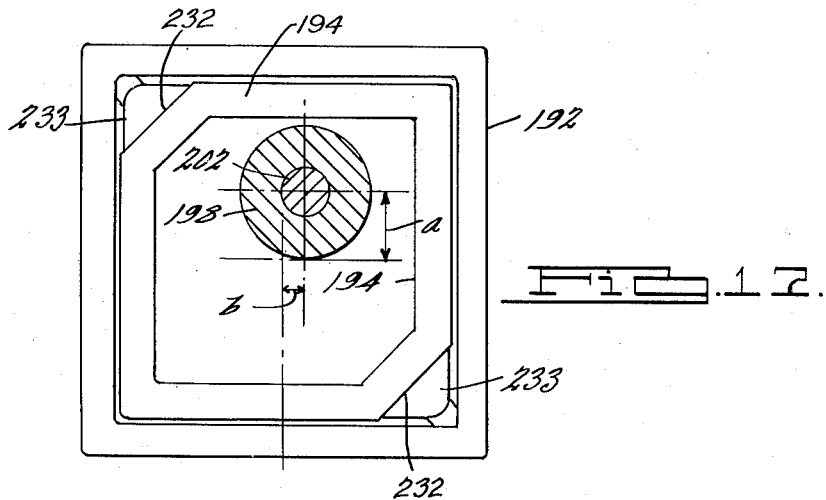
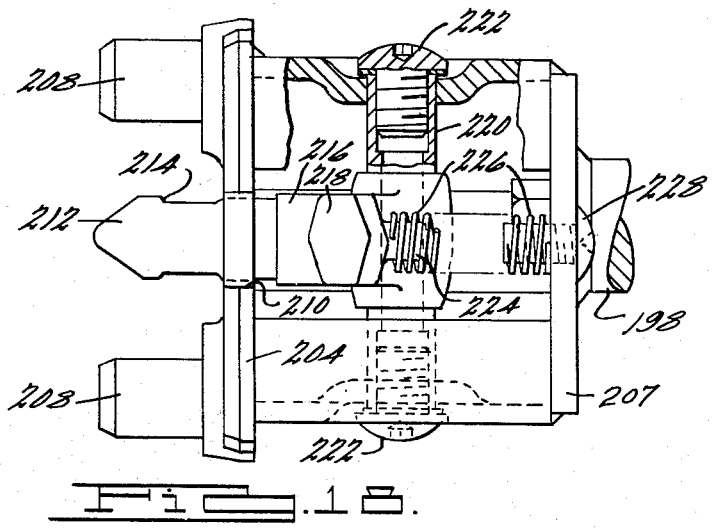

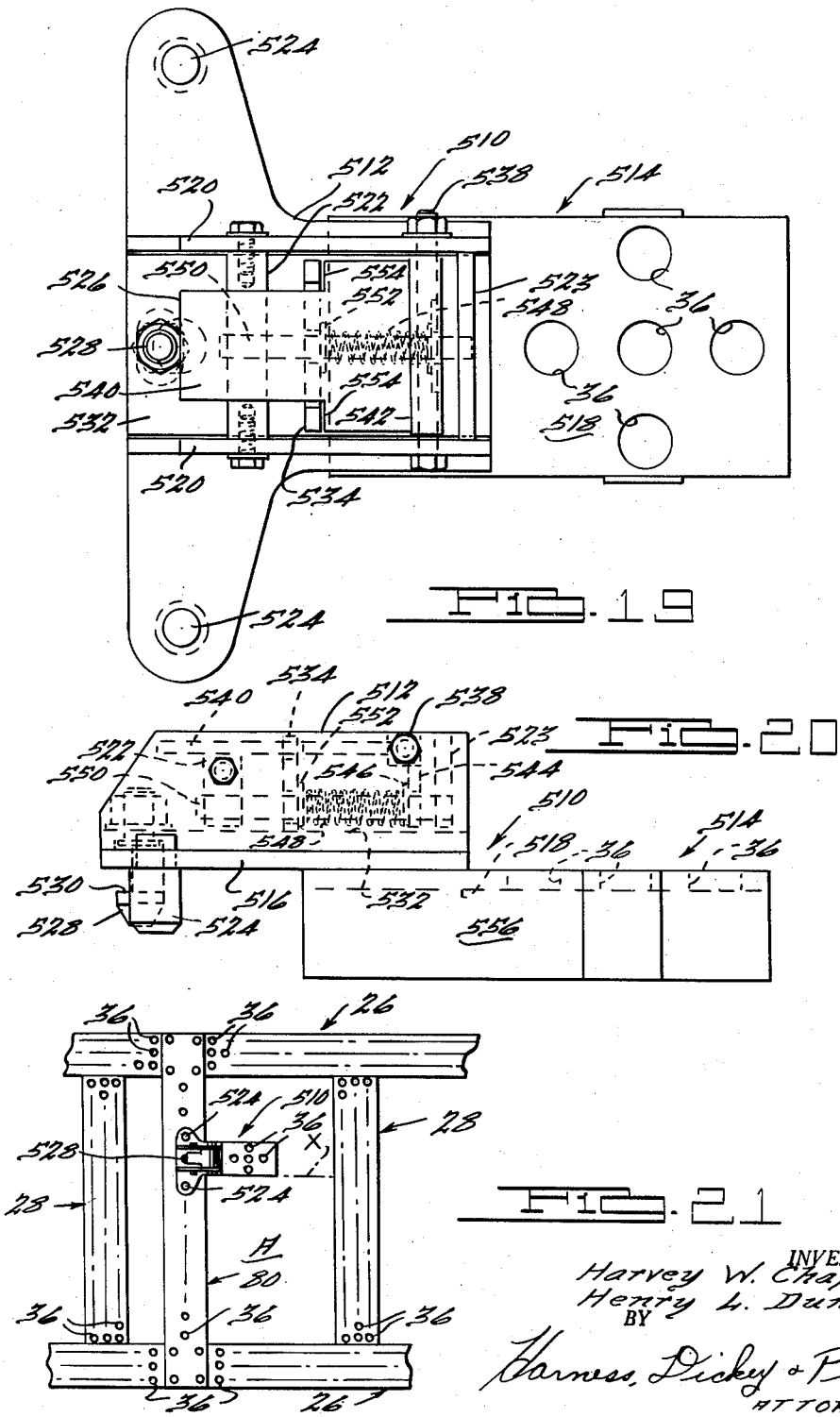

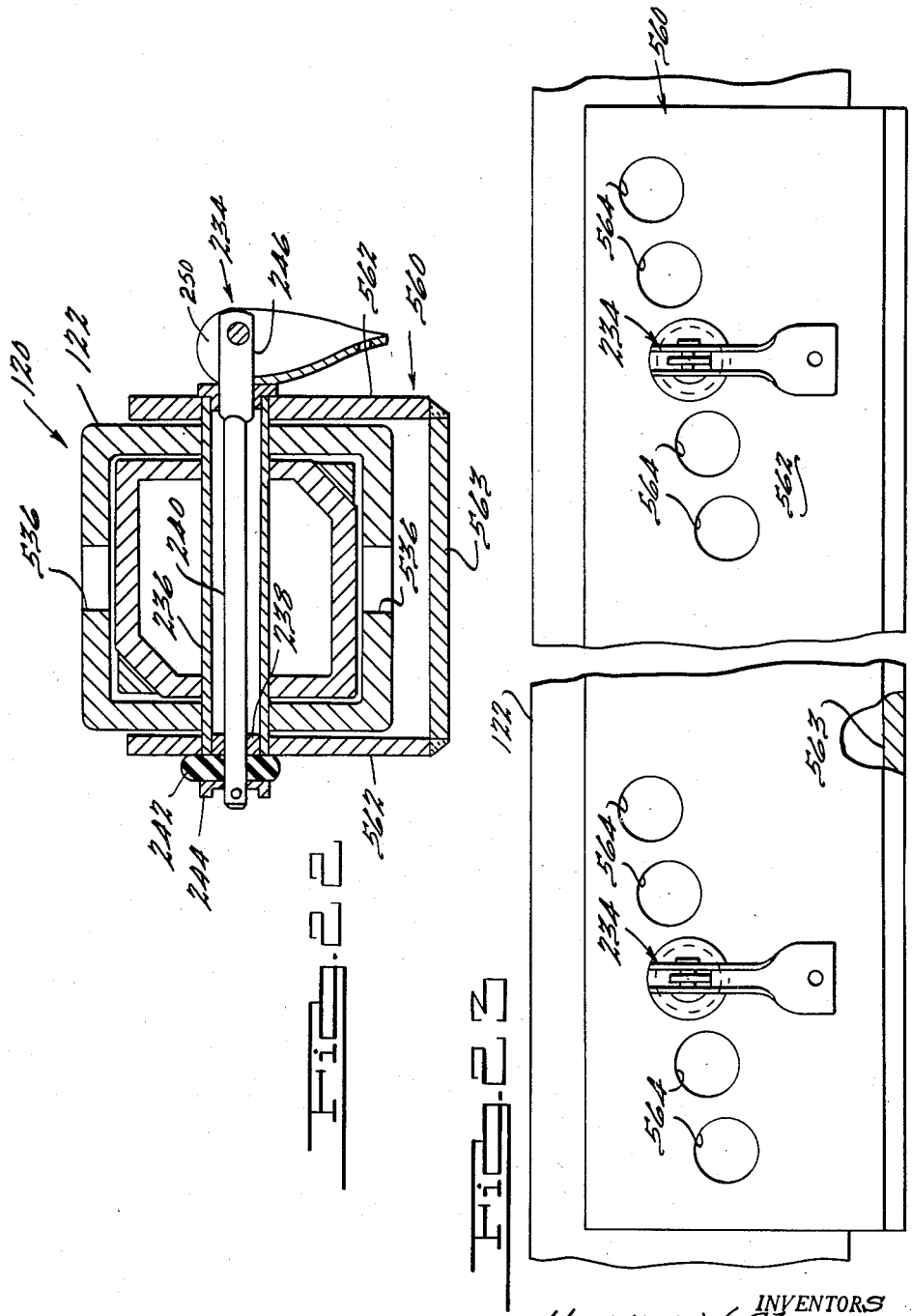

United States Patent Office 2,834,304
Patented May 13, 1958

2,834,304

FREIGHT LOADING APPARATUS

Harvey W. Chapman, Detroit, and Henry L. Dunlap, Dearborn, Mich., assignors to Evans Products Company, Plymouth, Mich., a corporation of Delaware Application September 21, 1954, Serial No. 457,474

17 Claims. (Cl. 105—369)

The present invention relates to the loading, stowage and securing of freight in ships, warehouses, freight cars and trucks, and other freight storage and freight hauling equipment. More specifically, the invention relates to freight loading equipment adapted for permanent installation and especially adapted to the stowage of palletized loads. Most specifically, the invention relates to permanently installed apparatus, dunnage and other equipment for the stowage of ammunition and other dangerous cargo in the holds of ships, which equipment is especially designed to expedite the breaking out of portions of the cargo, without disturbing unwanted cargo, while under way at sea.

It is a principal object of the invention to provide freight loading apparatus for permanent installation which will safely secure any type of freight and which permits quick and easy breakout of the cargo.

Another important object of this invention is to provide freight loading apparatus including portable, removable self-stowing dunnage members.

Still another important object is to provide freight loading apparatus using a combination of fixed and portable members which are of standard dimensions enabling the planning of the load before actual loading begins, yet which embody such flexibility that unexpected variations in freight dimensions or variations in hold dimensions from ship to ship can easily be accommodated.

Another important object of this invention is to provide freight loading apparatus which conserves space, provides greater accessibility, and simplifies rebracing of the load after a portion has been removed.

Yet another object is to provide freight loading apparatus employing standard members which are capable of highly specialized application such as the stowing and securing of munitions ranging from small to large sizes.

Other objects and advantages will be apparent, or will become apparent, in the following more detailed description of the invention, especially when taken in conjunction with the accompanying drawings, in which:

Fig. 4 is a perspective view similar to Figs. 2 and 3 showing a third manner of installing the permanent deck members, this method utilizing angle guides, angle brackets and seat plates;

Fig. 4A is a fragmentary view in perspective showing the manner in which a channel-shaped longitudinal deck member may be secured to the deck and removable horizontal deck members and planking secured thereto;

Fig. 5 is a plan view, with portions broken away and in section, of a portable deck member intended to be secured over the top of the permanent deck members of Figs. 1 to 4 in order to locate a bracing structure at intermediate points within the sides of the grid-like pattern;

Fig. 6 is a side elevation of the portable deck member of Fig. 5;

Fig. 7 is a perspective view, with portions broken away, of one end of the portable deck member of Figs. 5 and 6, and showing in particular the latching mechanism installed on both ends of such member;

Fig. 8 is an end view of the portable deck member of Figs. 5 to 7, the view being taken in the direction of the arrow 8 of Fig. 7;

Fig. 9 is a cross-sectional view of the portable deck member of Figs. 5 to 8, the section being taken along the line 9—9 of Fig. 5;

Fig. 10 is a side-elevational view, with portions broken away and in section, showing a telescoping vertical freight-bracing member such as is shown in Fig. 1, erected on the grid-like pattern of holes in the deck members;

Fig. 11 is a fragmentary longitudinal section through the latch-locking end of the vertical bracing member of Fig. 10, the section being defined by the arrows 11, 11 of Fig. 10;

Fig. 12 is a cross-sectional view of the vertical bracing member of Fig. 10, the section being along the line 12—12 of Fig. 10;

Fig. 13 is another cross-sectional view of the vertical bracing member of Fig. 10, the section being taken along the line 13—13 of Fig. 10, showing in particular the manner of securing the ends of the telescope spring mechanism;

Fig. 14 is a side-elevational view, with portions broken away and in section, of a tomming member (horizontal freight brace) such as is shown erected in Fig. 1;

Fig. 15 is a cross-sectional view of the square central body portion of the tomming member of Fig. 14, the section being taken along the line 15—15 of Fig. 14;

Fig. 16 is a cross-sectional view showing the lock pin assembly of the tomming member of Fig. 14, the section being taken along the line 16—16 of Fig. 14;

Fig. 17 is a cross-sectional view on line 17—17 of Fig. 14 through one end of the tomming member showing the offset nature of the mounting of the latch member;

Fig. 18 is an enlarged view, with portions broken away and in section, of one of the latch fittings of the tomming member of Figs. 14 to 17, the portion enlarged being indicated by the line 18—18 of Fig. 14;

Fig. 19 is a plan view of an auxiliary, portable T-shaped deck or overhead member for use in erecting vertical bracing members at points within a grid unit;

Fig. 20 is a side view of the member of Fig. 19;

Fig. 21 is a diagrammatic plan view showing one manner of using the member of Figs. 19 and 20;

Fig. 22 is a sectional view through the vertical bracing member of Figs. 10 to 13 and showing attached thereto an adjustable snugging member to enable the bracing member to support the cargo in situations where it is not possible or practical to correctly position a vertical bracing member; and Fig. 23 is a fragmentary side view of the adjustable snugger of Fig. 22, showing in particular one arrangement of holes provided for adjustability.

In accordance with the present invention, there has been provided a freight loading apparatus intended for more or less permanent installation in a freight transporting vehicle such as a ship, freight car, or truck, or warehouse and the like, which apparatus comprises a grid of fixed and/or removable deck members of structural metal assembled on a freight-supporting or other surface, preferably though not necessarily arranged in a square or rectangular pattern and disposed parallel or at an angle with the confining walls or surfaces and obstructions and other impedimenta so as to make the most efficient use of the surface area available; a matching grid-like pattern of structural metal deck members supported in substantially parallel alignment on the overhead above that on the freight-supporting surface or opposed to the other surface, the members of each grid pattern having on their juxtaposed exposed surfaces, at least, a pattern of aligned holes; portable deck members having a pattern of holes in an exposed surface and which span at least one unit of the grid-like pattern of deck and overhead members to serve as bulkhead anchors, etc. and as a base for the erection of bracing members at nearly any point within the pattern unit; and telescopically adjustable, vertical and horizontal freight bracing bars or members likewise having a pattern of holes on their surfaces, which bracing members are adapted to be erected on or between the opposed grid-like patterns by locking in the holes therein, together with auxiliary equipment such as T-shaped portable auxiliary members having a pattern of holes to assist in erection of vertical members any place on the surface and other devices disclosed in a divisional application hereof.

Figure 1:
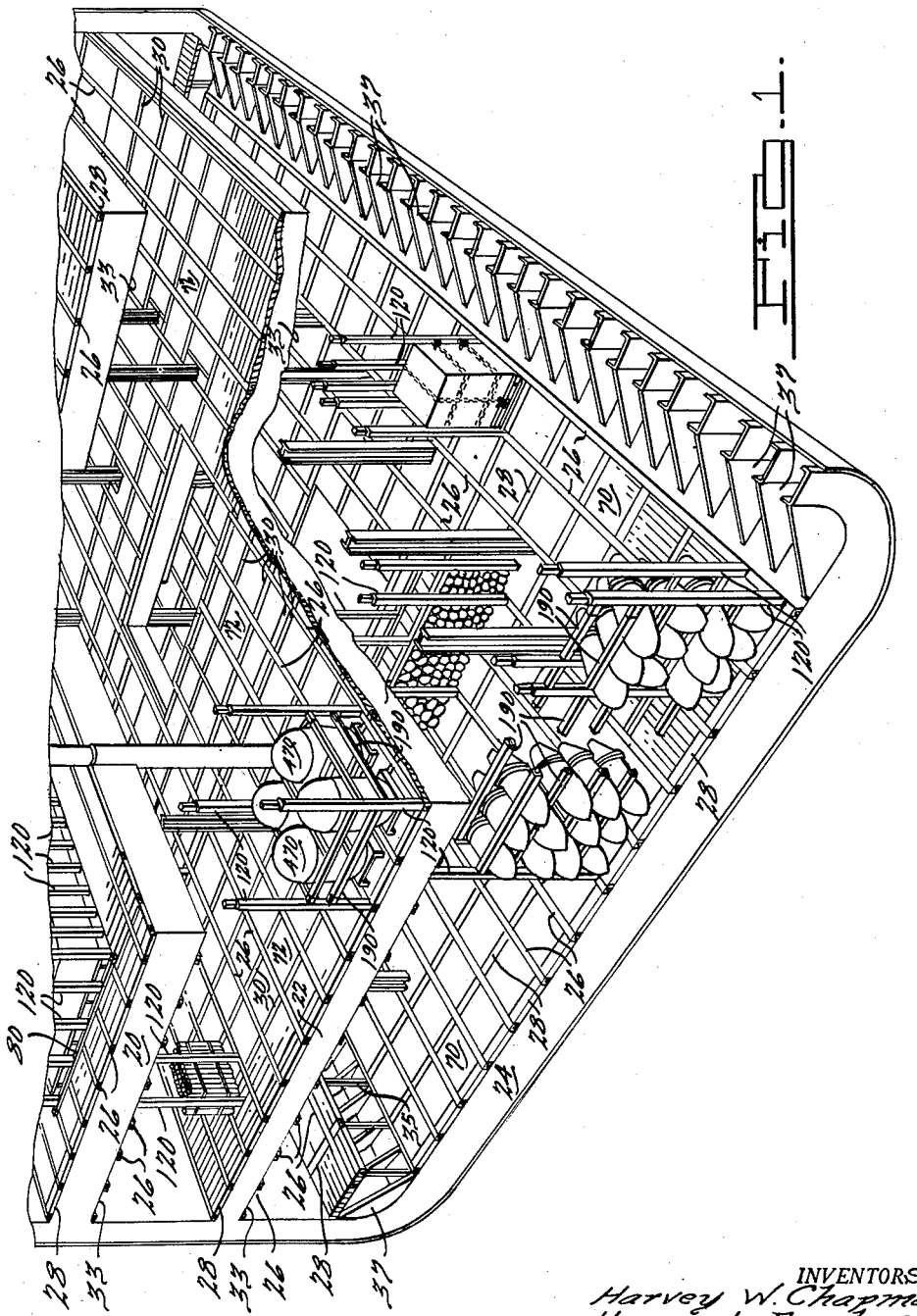
Fig. 1 is a perspective view with portions broken away of one hold of a cargo ship in which the freight loading apparatus of this invention is installed, and showing in particular the various manners in which the apparatus may be utilized to secure various kinds of freight.

In Fig. 1, there is shown a perspective view of one hold of an ocean-going freighter, the hold being under the main deck and having a second deck (not shown), a third deck 20 below the second deck, a first platform 22 below the third deck 20 and an inner bottom 24 below the first platform. On the third deck and inner bottom, there is somewhat schematically illustrated a grid-like pattern of deck and overhead members including parallel long structural metal members 26 running lengthwise of the ship and short horizontal structural members 28 extended across or between the longitudinal members, both types of deck members being fixed to the deck by any of the methods illustrated in Figs. 2 to 4A. On the first platform 22 there is shown a slightly different, alternative arrangement of deck members wherein there are, as on the third deck 20 and inner bottom 24, longitudinal structural metal members 26 extending fore and aft of the ship and removable transverse or horizontal deck members 30 (see Fig. 3) which have spring-biased clevis latch pins 32 on their ends for insertion into and locking with any of a pattern of holes 34 on the sides of the fixed longitudinal deck members 26. In both cases, the longitudinal 26 and horizontal 28, 30 deck members are preferably arranged to form squares.

In both of the grid-like pattern systems illustrated in Fig. 1, the grid-like deck pattern is duplicated on the overhead surface 33 and on a framework 35 over the bottom gussets 37 so that the opposed members of each pattern are in accurate alignment. In both arrangements of deck members 26, 28 (or 30), their exposed surfaces (see Figs. 2 to 4) have at least two, and preferably three, straight lines of holes 36 in which the distance between lines and holes are, preferably, though not necessarily, the same. As can be seen in Figs. 3 and 4, the holes 36 in the adjacent lines are not staggered so that they also lie in straight lines of preferably three holes extending perpendicularly to the lengths of the members 26, 28, and 30. This provides a grid-like pattern of holes in deck and overhead in any pair or trio of which various types of self-locking bracing members, cargo jacks, chock assemblies, wedge assemblies and chain and cable hook and shackle assemblies may be secured. Any of the latter may be inserted in a group of holes in one line or across the lines in adjacent, aligned holes. As will be pointed out in greater detail in conjunction with Figs. 4 to 9, portable deck members 80 are provided, which have a length enabling them to span the grid in either direction, which are locked into holes to serve as bulkhead stops, as a base for verticals and as an anchor for racks, chocks, wedges, jacks, etc., at any intermediate point within the sides of the square of the deck or overhead grid. This enables the erection of verticals at nearly any position on the freight loading surface.

As will be more clearly described in connection with Figs. 10 to 13, the vertical or upright bracing members 120 have on all four sides a pattern of lines or a line of holes 36 arranged on the same center distance pattern as those of the deck members 26, 28 or 30. This permits the insertion of horizontal self-locking, pivotable bracing and tomming members 190 such as are shown in greater detail in Figs. 14 to 18. Together with the vertical bracing members 120 and/or portable deck members 80, bulkheads, walls, racks, shelves, anchors, etc., that differ widely in shape, description or complexity may be erected in many different places on the freight-supporting surface. The horizontal bracing or tomming members 190 and portable deck members 80 likewise have on their exposed surfaces a pattern of lines of holes 36 matching that of the deck and vertical members.

Figure 2:
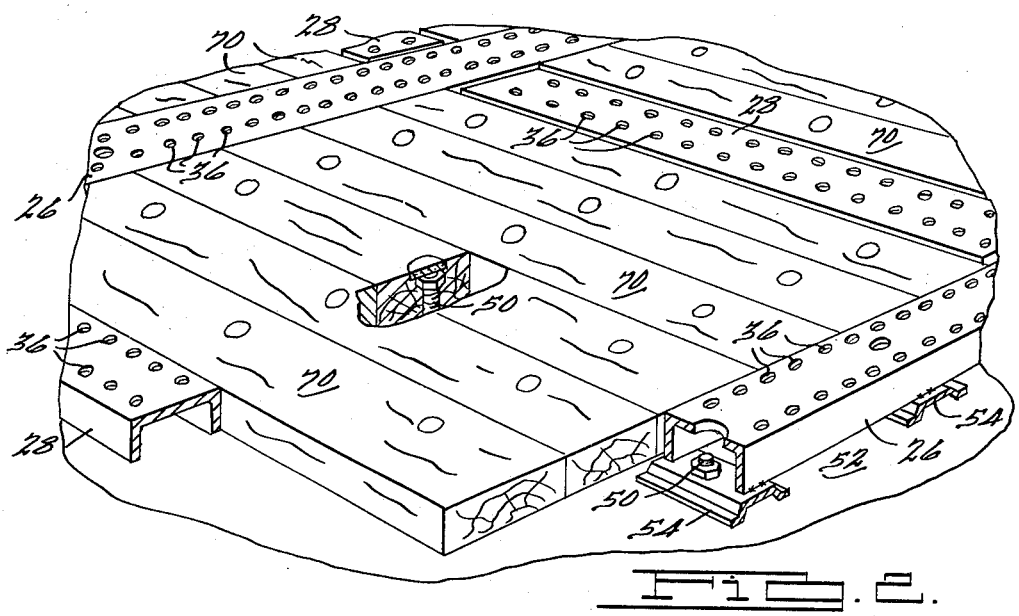
Fig. 2 is a perspective view, partially in section, showing one manner of installing the permanent deck members utilizing hold-down plates to secure a channel-like sectioned member.
Figure 3:
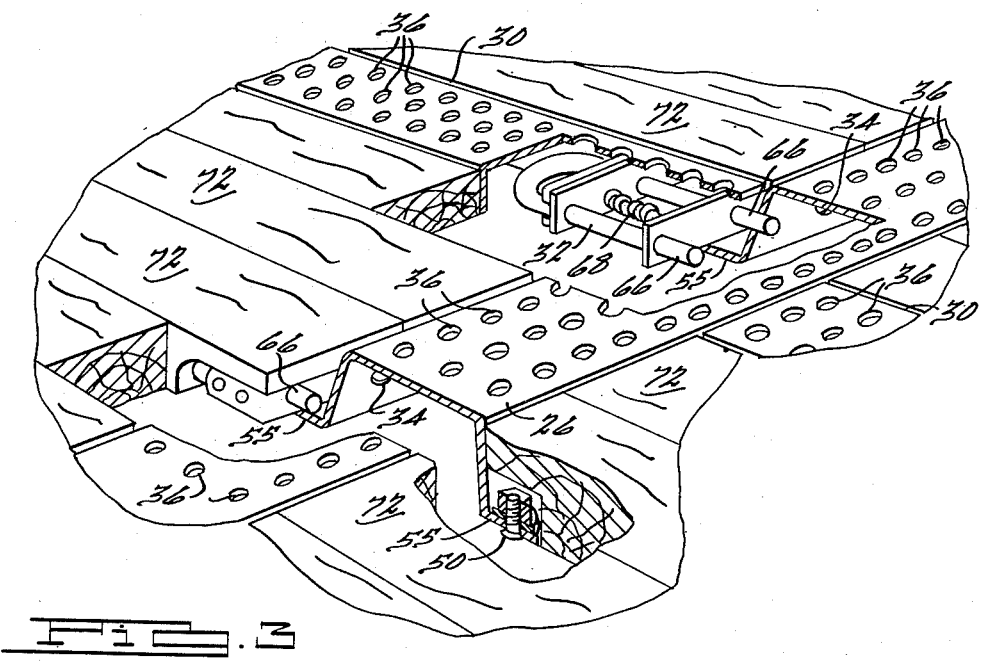
Fig. 3 is a perspective view similar to Fig. 2 showing a manner of installing permanent longitudinal deck members having a "hat" section by means of studs welded to the deck together with the use of removable horizontal deck members and planking.

Referring now more specifically to Figs. 2 to 4, it will be seen that the longitudinal deck members 26 may have a simple channel cross section as shown in Figs. 2 and 4, or a "hat" section as shown in Fig. 3, or the shape of any other channel-like structural member. As shown in Figs. 2 and 4, a series of stud bolts 50 are welded directly to the metal deck 52. Over the resulting lines of studs a hold down plate such as plate 54 in Fig. 2 is bolted and the longitudinal deck members 26 are edge welded directly thereto. For the deck member arrangement of the third deck and inner bottom, the transverse deck members 28 are secured in the same fashion. As will appear in Fig. 3, the longitudinal deck members 26 having a "hat" section are secured by parallel lines of studs 50 welded directly to the deck and which are passed through bolt holes provided in the projecting flange 55. The flange is then slipped over the studs and secured thereto. Also, as shown in Fig. 4, longitudinal deck member 26, of simple channel cross section, may be provided with welded-on washers 56 and angle brackets 58. An aligned pattern of studs 50 is first welded directly to the deck so that the channel seat plates 56 and channel 26 can be slipped thereover. The seat plates 56 are then welded to the angles 58. Then the angles 58 are welded to the outside of the channel. Lastly, the angles 60 are positioned against channel 26 and angles 58 and welded to the deck. While the latter is a more expensive installation, it offers greater rigidity in the deck and prevents chance displacement of deck members due to loosening of studs or nuts by vibration.

In the two deck member arrangements shown in Fig. 1 the longitudinal members 26 may be anchored to the metal ship deck by any of the methods shown in Figs. 2 to 4 and by any other suitable arrangement. In the arrangement shown on the first platform (Fig. 3), however, the transverse deck members 30 are removable and are anchored on both ends in holes 34 in the longitudinals 26 by means of a spring biased U-type of clevis 32 wherein the pin-like ends 66 are inserted in the holes 34. The pins 66 are retracted by a screwdriver-like tool, rod or lever inserted through one of the holes 36 so as to engage the closed end of clevis 32 and retract it against the action of spring 68. The use of removable members 30 provides a flush deck and permits the ready re-arrangement of the basic grid-patterns on the deck and overhead surfaces to suit special cargo types. The apparatus employing fixed transverse members, however, is less expensive to build and maintain due to the lesser number of latches, tools, etc., required, and it also contributes greater rigidity and load-bearing ability to the metal deck or other freight-supporting surface.

With either fixed or removable horizontal deck and overhead members, the interior area of each square of the grid is usually filled in with suitable top decking material, such as the wood planking 70 shown in Figs. 2 to 4, or synthetic tile, rubber or plastic-covered composition board, and the like. This is to provide a level non-sparking surface on which to stow freight. As shown in Figs. 2 and 4, the wood planking or plywood can be secured to the metal deck by several lines of studs 50 welded directly to the deck. The latter arrangement contributes increased rigidity and weight carrying capacity to the deck. The overhead grid pattern, however, usually is not filled in in this manner. Likewise, as shown in Fig. 3, with the arrangement utilizing removable transverse members 30, the space inside the square is filled in with removable planking members 72 each member having a U type clevis latch 32 similar to that of the removable horizontal deck members 30. While this arrangement is more versatile, the planking 72 does not contribute rigidity to the deck. If desired for the stowage of ammunition, the various metal deck and bracing members can be provided with a non-sparking rubber or plastic covering or be made of a non-sparking metal such as aluminum.

*Portable deck members*

On the above-described grid-like pattern of holes, portable deck members 80 (Figs. 5 to 9) are disposed at any intermediate point. The member 80 has a fixed length equal in length to a side of the square, a rectangular cross section made up of a pair of bottom plates 81 and a channel-like body member 82 (Figs. 8 and 9) having in its top surface a line of holes 36 in in-line arrangement, and on either end a pair of opposed, lever-operated lock or latch pins 86, 88 and a fixed load-bearing pin 90 therebetween, the pins all lying in substantially one plane extending perpendicular to the body member 82. The bottom plates 81 and the channel 82 are bolted together by carriage type bolts 83 tapped into spacer legs 85 integral with the plates 81. The pins 86, 88, and 90 are inserted in any three holes in a pair of transverse or longitudinal deck or overhead members 26, 28 or between any parallel pair of vertical or horizontal bracing or tomming members.

The end-lock arrangement for pins 86, 88 is best seen in Figs. 5 and 7, the pins each being secured to a lever 92, each of which is pivoted on its inner end on a pin 94 passed through bottom plate 81. Each of pins 86, 88 are secured to its lever 92 by a lock nut 100 and large washer 101. Each lever 92 has a transversely-projecting lock handle portion 96 having upturned or downturned ends 98, the handle 96 for each lever 92 passing over or under the other lever 92 to project on the far side. Across the post-like upper ends 102 of the pins there is secured a transverse extension spring 104 which urges the pins 86, 88 together. The upper ends 102 are supported by bearing against the upper inner surface of the channel web. Since the inner surfaces of each of the lock pins are cut away to form a dog or shoulder 106, the action of spring 104 will cause the pins 86, 88 to move toward each other and engage the inner circumference of each grid hole 36 and lock the member thereto. Insertion of lock pins 86, 88 into the holes is facilitated by the conically tapered lower ends 108 which will cam the pins apart against spring resistance. The end lock mechanism on each end of the member is released by simultaneously pressing in on each end 98 of the lock handle portion 96 of levers 92, this movement releasing the shoulders 106 and freeing the pins 86, 88. The end-lock mechanism may also be opened by inserting a round-ended bar, or other like tool, through one of the holes 36 near the intersection of the levers 92 and moving a tool to spread the inner ends of the levers 92 thereof. As is shown most clearly in Fig. 5, one of the lock levers 92 has an integral cam surface 110 formed by spot welding a piece of metal to top surface 4 of the lever to bring it level with the top surface of the other lever, the rounded cam surface 110 serving as a smooth tool engaging surface against which the unlocking tool rotates. As will be noted, the portable deck member 80, unlike the permanent deck grid members, has in its top surface 112 only a single line of holes 36. Since the member can be placed at any point in the sides of the squares a double row is usually unnecessary, although any number of lines could be provided, if desired.

*Vertical bracing member*

Figs. 10 to 13 illustrate the construction of the telescoping vertical freight bracing member 120. The latter has an elongated main body portion 122 of substantially square cross section having in each of its sides a pattern of holes 36 corresponding in spacing to that of the deck grid members 26, 28. While other cross-sectional shapes may be employed, it has been found that the square section is most versatile. On one end of the square body portion, normally considered the top end of the member, there is a projecting telescopic fitting member 124 also having a square cross section. Welded to the outer end of telescope member 124 is a head plate 126 on which are integral pins 128 spaced at twice the distance between holes 36 for insertion in the permanent or portable deck and overhead grid holes 36. On the other end of member 120, there is a fitting 130 comprising a sleeve 132 of square cross section which is bolted into the end of body section 122 by means of bolts 134. Attached to the outer end of sleeve 132 is a head plate 136 to which are attached the two fixed load-bearing pins 128 similar to and axially aligned with those on the upper end and which also are spaced apart at twice the distance between grid holes 36. Midway between and substantially coplanar with pins 128 there is provided a latch or lock pin 140 which extends through a hole 138 in head plate 136 and is an integral part of a pivotable latch lever 142. The latter is pivoted on a hollow shaft 144 which is extended across and mounted on opposite side sections of the sleeve 132, being held in place by the body section 122. Collars 146 are provided to prevent chance displacement of shaft 144. In order to spring bias the latch lever 142 and make its projecting pin 140 self-locking, a small projection or arm 148 on lever 142 is connected to an extension spring 150 having its other end connected to a pin 152 which is extended across sleeve 132 and held in position by the overlapping body section 122.

The square upper telescopic fitting 124 is supported in a square sleeve 170 which is bolted into the end of body section 122 by means of bolts 171, the sleeve 170 having integral end plates 172 and 173 which serve as supports for slide 124. On its inner end, slide member 124 is connected to a round extension shaft 174 by means of an end plate or collar 175 and by a bolt 177 passing diagonally through the slide 124 and extension shaft 174. On its other end, extension shaft 174 is guided by a diagonal spanner-type slip collar 176 having rounded ends which fit into the corners of body 122. A pair of elongated bolts 178 are passed through end plate 173 and through slip collar 176 to compress a compression spring 180 disposed around the extension shaft 174. Tightening or loosening of the nuts on bolts 178 increases or decreases the force exerted by spring 180. The latter is adjusted to exert sufficient force to support the full weight of the member 120 on the head plate 126 so as to maintain engagement of the pins 128 in the grid holes 36 whether the member is used right side up (resting on head plate 136) or upside down, as just described.

In use, the vertical bracing member 120 may be installed by first inserting the pins 128 in its upper telescoping end in the holes 36 of the overhead grid, pushing upwardly on the member to telescope it sufficiently to give clearance to the lower lock pin end 130, and then aligning pins 128 and 140 with holes in the lower deck and pushing the bar 120 down into position, the tapered end of latch pin 140 camming it to the left in Fig. 11 so it will enter the hole and then be snapped back into locking position by gravity and spring 150. The verticals 120 may be unlatched for removal by raising handle 156 or depressing handle 157 until latch shoulder 158 of the latch pin 140 is disengaged from the edge of hole 36. The latch fitting 130 may be inserted first, if desired, to provide for installation by the reverse of the procedure mentioned.

In some cases, it may be desirable to clamp or bolt auxiliary wooden or metal strips to one or more sides of the vertical member 120 in order to make contact with odd-shaped items of cargo and yet present a straight line of verticals to the next tier of freight or to an aisle. In case the freight is odd shaped or standardized crates or pallets are incorrectly dimensioned, the added thickness of wood or metal would do away with the necessity for having one vertical out of line with respect to the others in the same line.

*Tomming member*

The details of the horizontal bracing bar, or tomming member 190, are shown in Figs. 14 to 18. Like they vertical bracing member 120 the member 190 has an outer body section 192 of square cross section but it differs in that both ends have fittings 200 that are telescopic in the body and provided with means to mount and secure the bar in holes 36. It should also be noted that the fittings 200 are mounted off center (Fig. 17) at different distances "a" and "b" with respect to each mid-plane of the member to permit rotation of the body section 192 to provide a pitch-splitting feature to take up progressive increments of slack between one or more grid holes 36. As shown in Fig. 14 the hollow body section 192 receives the fittings 200 in both ends, each fitting including an inner telescope slide or sleeve 194, square in cross section and provided on two sides with holes 196 having a closer spacing than the holes 36 in outer body section 192, for example 1.25 inches as against 1.5 inches for the holes 36. The sleeves 194 do not meet in the center of the body 192 so as to permit them to freely slide in and out to shorter or lengthen the member 190. Inside each of the outwardly projecting end portions of sleeves 194 there are two transverse shaft bearing end plates 197 in which is supported a short, round, hollow shaft 198, the latter being located off center in end plates 197 as indicated by dimension lines *a* and *b* in Fig. 17. The shaft is held in axial position by means of a bolt 202 extended through end plates 197 and shaft 198. A washer 204 and a lock nut 206 are provided on the inner end of bolt 202 to hold the parts together. It will be seen that the body portion 192 can be rotated about the offset axis of shafts 198 to take up small increments of slack between the member and freight after the ends have been located in the nearest sets of holes 36 in the vertical members.

The fittings 200 each have a latch assembly welded to shafts 198 which include body section 203, a pin-supporting outer plate 205, and an inner shaft-attached plate 207. The pin-supporting plate 205 has two straight, integral locator and load transmitting pins 208 (Fig. 18) and midway between which there is an enlarged hole 210 through which a latch pin 212 is mounted. The pins 208 and 212 are substantially coplanar though the center line of the latch pin 212 is offset slightly above that of the rigid pins 208 as seen in Fig. 14 so that it will be slightly misaligned with the hole 36 when the pins 208 are aligned with a pair of holes 36. The latch pin 212 has a shoulder 214 for engagement under the edge of each of the holes 36 in the vertical members. The latch or lock pin 212 is an integral part of a latch lever 216 having a handle 218 projecting on either side. The lever 216 is pivoted on a hollow shaft 220 also offset above the center lines of pins 208 and which is bolted in place on the side walls of body 203 by means of end bolts 222. On a projecting anchor arm 224 there is secured a compression spring 226 having its other end anchored to a bolt 228 in the shaft attached inner head plate 207.

The latch lever 216 can be operated by pulling or pushing on either handle 218 to disengage the shoulder 214 of lock pin 212 from the edge of the hole. Likewise the pins 208, 212 can be inserted by first positioning the straight-sided pins 208 above the grid holes 36 and then moving the handles 218 until pin 212 comes into alignment allowing all three to enter the holes. Release of the handles 218 locks shoulder 214 under the edge of the hole 36. It is also clear that if the latch is not manually unlocked during insertion of the bar in the holes, the tapered end of the lock pin 212 will be cammed toward the pins 208 (down in Fig. 14) to enter a hole and then will be snapped back into latching position by spring 226.

As pointed out above, the sleeves 194 of fittings 200 can move inwardly to give clearance for the pins 208, 212 and outwardly to increase the overall length of the tomming member 190. A triangular stop 229 is provided on opposite corners of each end of outer body member 192 to limit outward movement, the stops being anchored by set screws 231. The sleeves 194 have their corresponding corners shaped at 232 to pass over the stops and provided with shoulders 233 to limit outward movement by engagement with stops 229.

When the length of the bar has been adjusted and the pins 208, 212 of both ends locked in the holes of the vertical members, a lock pin assembly 234 (Fig. 16) may be passed through opposed holes 36 in body section 192 and opposed holes 196 in sleeves 194. Due to the closer spacing of holes 196 a vernier adjustment of the length of the member is possible. The lock pin 234 (Fig. 16) comprises a hollow tube 236, a pair of collars 238, and a lock rod 240 passed through tube 236 and both collars. On one end of lock rod 240 there is located a compressible rubber or plastic rubber washer 242 held in place by an outer cap 244. On the opposite, or handle end, of rod 240 there is secured a clevis 246 in which there is mounted an eccentric handle 248, the latter having a round cam surface 250. When the handle 248 is brought to the dotted line position of Fig. 16 the cam will be of minimum radius (seen best in Fig. 22) with the result that the washer 242 is uncompressed and can be inserted through the holes 36, 196. When, however, the handle is rotated 180° to the position indicated in solid outline, the washer 242 will be compressed making it impossible to withdraw it through the holes. The lock pin assembly 234 is simple in operation and can be quickly inserted in the member after it has been mounted in place.

*Auxiliary T Member*

As pointed out above the portable deck members 80 and rotatable tomming members 190 make for flexibility with the grid pattern of fixed deck and overhead members 26, 28. These members make it possible to erect the vertical bracing members 120 at intervals corresponding to the spacing of holes 36 anywhere on the freight supporting surface. Instances may occur, however, where a tier or row of freight "A" ends in the interior of a square (see dotted outline X Fig. 21). In such instances, it is possible to mount a number of the portable deck members 80 on the overhead in side-by-side relation to receive the upper ends of vertical bracing members 120 on each side of the corner. On the deck, however, the freight and the first portable member 80 interfere with the placement of another intersecting portable deck member 80 to brace the other side "X" of the corner. For this situation, the portable T member 510 is provided. The member 510 comprises a "head" section 512 secured on top of a "leg" section 514. The head section 512, which contains the latch pins and locking assembly, comprises a wing-shaped base plate 516 welded to a top plate 518 of the "leg" section 514, two upstanding side plates 520 welded to plate 516, a transverse brace block 522 and end plate 523, and on the bottom side of the extremity of each wing a fixed, straight-sided pin 524. In the center of plate 516 there is provided a hole in which is disposed a latch-operated lock pin 528 substantially coplanar with pins 524 and having a shoulder 530 for engagement with the edge of a deck grid hole 36 in which it is inserted. The pin 528 is secured to a slide plate 532 by means of a nut threaded over the upper end of the pin. The plate 532 is provided with an upstanding, welded on spacer-guide plate 534 to guide the plate 532 in its back and forth sliding movement between side plates 520.

A bolt 538 is passed through both side plates 520 to serve as a pivot for a tongue-shaped latch-operating lever 540. The latter is welded to a sleeve 542 which encircles bolt 538. Also welded to sleeve 542 is a short, downwardly-depending arm 544 which makes contact with a spring-retainer collar 546 in contact with a coiled compression spring 548 carried by a rod 550. The latter is supported by the brace block 522 and end plate 523 with the other end of spring 548 bearing against a second spring-retainer collar 552 and guide plate 534. With this arrangement, the spring 548 is full floating and always acts to urge the plate 534 and its sliding mechanism to the left or locking position. The spring 548 also normally acts to depress the lever 540 to the closed position. The shoulders 554 on either side of the tongue bear against plate 534 and prevent accidental displacement of the pin 528 and its sliding mechanism toward the right or to the unlocked position.

The member 510 is installed in deck or overhead grid holes by raising the tongue-like lever 540 until the shoulders 554 are clear of plate 534, the pin 528 is grasped by its nut and pushed to the right (or else cammed to the right by engagement of its tapered bottom with the edge of a hole 36), all three of pins 524, 528 then are pushed into holes, and the lever 540 released. The member is then locked into position with all load being borne by shoulders 554 instead of by spring 548.

The "leg" section of the T-shaped member comprises three plates 518, 556 welded to form a rectangular box-shaped member. The top plate 518 is provided with five holes 36 arranged in a square with one hole in the center so that the three pins of vertical bracing members 120 can be inserted in either of two directions. As will appear most clearly in Fig. 21 the member 510 will be placed with the wing-shaped "head" 512 placed over the top surface of the member 80. The "leg" section 514 rests flat on the deck or planking members 70 to serve as a firm anchor for a corner vertical bracing member 120.

*Cargo Snugger Attachment*

As mentioned hereinbefore, in some instances odd-shaped articles of freight or cargo, or off-dimensioned crates, pallets, etc., make it impossible to insure contact with a straight line of vertical bracing members 120. In some instances, as explained hereinbefore, this contingency can be taken care of by gluing or bolting a piece of wood or metal to the verticals but this requires a series of members with various thicknesses of strips. The attachment 560 shown in Figs. 22 and 23, however, can be attached to bracing bars available in the ship and the attachment so designed so as to be adjustable outwardly a distance to cover most commonly occurring contingencies.

The snugger attachment 560 comprises a U-shaped frame made by welding two side plates 562 and a front plate 563 together at right angles. The frame may be made sufficiently long to cover substantially the entire body section 122 of the vertical bracing members 120 or they may be made a fraction of the body length so that one or more may be installed as required. The frame is slipped over the outside of the square body section 122 (Fig. 22). Adjustability is provided by an angularly aligned pattern of holes 564 on each side of the frame, preferably near both the top and bottom ends. As shown in the side view of Fig. 23 the centers of holes 564 are disposed on a line intersecting the longitudinal center line of side plate 562 so as to provide incremental adjustment in an outward direction. The holes 564 are spaced apart at the same center distance as the holes 36 in the body section 122 of the bracing member or rather the distance between like holes in the frame must be a multiple of the spacing between holes 36. A suitable means for securing the frame of the snugger 560 to the bracing member 120 is similar to the lock bolt 234 shown in Fig. 16. At least two such bolts usually will be required. Separate lock bolts inserted from each side of the member could be utilized, if desired. At least one of the holes 564 preferably should be located on the longitudinal center line of the side plates 562 in order to permit retraction of the frame to bring front plate 563 into contact with the body 122 of the bracing member so that such members can be used without extension of the snugger where this is necessary.

The apparatus of this invention is installed in a freight-transporting vehicle, such as a ship, or in a freight-storage area, such as a warehouse, with the fixed and/or removable deck members 26, 28 first being affixed to a deck, floor or wall most advantageously employed at a spacing found most convenient. In a ship, for instance, a spacing of about four feet may be employed because such a pattern permits breaking up of the cargo into self-contained units with ample aisle space for access. The bulky freight or cargo items are then simply moved into position and secured by erection of an appropriate number of vertical and horizontal bracing bars. The latter are strong and light enough in weight as to be easily handled and installed by one man. Since the dimensions of crates, pallets, boxes, etc., even though of standardized design, vary as much as 1 or 2 inches, it can be readily appreciated that the final length of rows or tiers of such items are seldom known until they are laid end to end and side by side. This is no serious disadvantage with the apparatus of this invention since the gridlike pattern of holes in the deck and overhead members permit the erection of verticals at very small intervals. For example, the grid holes 36 of the deck and overhead members of the installation shown in Fig. 3 were located on 1.5 inch centers. There are, however, instances where a corner or an entire row or tier terminate at a point within the square defined by the intersecting deck members. The apparatus of this invention provides portable deck members, auxiliary T members and rotatable off-center horizontal bracing members to take care of these contingencies. By locating one or more portable deck members and/or T members at any point within or between the intersections of the grid members it is possible to locate verticals, for example at 1.5 inch intervals. The cargo snugger attachment on some of the vertical members takes care of situations where the verticals must be in a straight line for aisle purposes, etc. The horizontal bracing members can then be installed and rotated to take up increments of less than 1.5 inches in order to insure lateral contact with the cargo or freight.

Breakout of portions or individual items of freight or cargo is much simplified with the apparatus of this invention. The easy placement of verticals make it a simple matter to lay out adequate aisles and lanes between dissimilar types of cargo. After removal of a portion of the cargo the bracing members are moved in to engage the remaining items of freight in the row or stack, or they may be removed entirely and stored at a convenient point near a hatchway or door, etc. Stowage of the unneeded bracing members entails nothing more than inserting the pins of the bracing members in unused, out-of-the-way deck members to form a compact vertical or horizontal row or stack of members. This same self-stowing feature also facilitates loading, the reserve members being stowed near the hatchway, elevator or entryway where they are always available for use as the loading proceeds from the far corners and progresses toward the entryway.

While only a few preferred embodiments of the invention have been disclosed herein it is to be understood that further variations and modifications can be made without departing from the spirit and scope of the appended claims.

What is claimed is:

1. A freight bracing bar for extending between and being supported as its ends in aligned series of holes in spaced support surfaces, said bar comprising an elongated body having fittings adjacent the respective ends of the body that are no wider than the body and each of which has a pair of pins for entry into selected said holes to secure the bar in place, said body having at least one elongated bore extending lengthwise of the body and opening out of one end thereof, one of the fittings having a portion telescopically mounted in said bore, coengageable stop surfaces on said one fitting and body for limiting the telescopic movement of said one fitting in said bore, both said fittings having side sections which are laterally spaced from each other and extend parallel to the length of the bar, the pins of each said pair being laterally spaced from each other and rigid with the corresponding fitting and projecting parallel to each other and to the length of the bar and located on opposite sides of the fitting, said pins of each pair having tapered ends for extending into spaced pairs of said holes in a said support surface, each fitting having a latching lever located centrally between the corresponding said side sections and pivoted on the corresponding fitting for movement about an axis transverse to the length of the body, each said lever including a handle portion located between the corresponding said side sections and movable in a plane parallel to them, each said lever further including a tapered-end latch pin extending parallel to the corresponding said side sections for entering a said hole intermediate said spaced pair of holes, each said latch pin being located approximately midway between the corresponding rigid pins and approximately in a plane defined by such rigid pins, each said latch pin having a transverse locking surface thereon facing toward the bar body for engaging behind said support surface when the lock pin extends through a said intermediate hole, spring means acting between the lever and each fitting and biasing the corresponding said latch pin to a position in which it partially but not completely registers with a said intermediate hole when the corresponding rigid pins completely register with said pair of holes, each said latch pin being movable against the opposition of said spring means to a position in which it registers with a said intermediate hole, thereby enabling said fittings to be moved toward the respective said support surfaces to thereby project said rigid pins and said latch pins through the corresponding holes and enabling the latch pins to engage behind the said surfaces and prevent withdrawal of the pins from the holes.

2. A freight bracing bar for extending and being supported at its ends in aligned series of holes in spaced support surfaces, said bar comprising an elongated body having fittings adjacent the respective ends of the body and each of which has a pair of pins for entry into selected said holes to secure the bar in place, said body having at least one elongated bore extending lengthwise of the body and opening out of one end thereof, one of the fittings having a portion telescopically mounted in said bore, coengageable stop surfaces on said one fitting and body for limiting the telescopic movement of said one fitting in said bore, the pins of each said pair being laterally spaced from each other and rigid with the corresponding fitting and projecting parallel to each other and to the length of the bar and located on opposite sides of the fitting, said pins of each pair being adapted to extend into spaced pairs of said holes in a said support surface, each fitting having a latching member pivoted on the corresponding fitting for movement about an axis transverse to the length of the body and comprising a latch pin extending parallel to the corresponding rigid pins for entering a said hole intermediate said spaced pair of holes, each said latch pin being located approximately midway between the corresponding rigid pins and approximately in a plane defined by such rigid pins, each said latch pin having a transverse locking surface thereon facing toward the bar body for engaging behind said support surface when the latch pin extends through a said intermediate hole, spring means acting between the latch member and each fitting and biasing the corresponding said latch pin to a position in which it partially but not completely registers with a said intermediate hole when the corresponding rigid pins completely register with said pair of holes, each said latch pin being movable against the opposition of said spring means to a position in which it registers with a said intermediate hole, thereby enabling said fittings to be moved toward the respective said support surfaces to thereby project said rigid pins and said latch pins through the corresponding holes and enabling the latch pins to engage behind the said surfaces and prevent withdrawal of the pins from the holes.

3. A freight bracing bar for extending between and be supported at its ends in aligned series of holes in spaced support surfaces, said bar comprising an elongated body having fittings adjacent the respective ends of the body and each of which has a pair of pins for entry into selected said holes to secure the bar in place, said body having at least one elongated bore extending lengthwise of the body and opening out of one end thereof, one of the fittings having a portion telescopically mounted in said bore, coengageable stop surfaces on said one fitting and body for limiting the telescopic movement of said one fitting in said bore, the pins of each said pair being laterally spaced from each other and rigid with the corresponding fitting and projecting parallel to each other and to the length of the bar, said pins of each pair being adapted to extend into spaced pairs of said holes in a said support surface, a latch carried by each said fitting for movement thereon between latching and releasing positions, each said latch including a latch pin extending parallel to the corresponding said rigid pins for entering a said hole intermediate a said spaced pair of holes, each said latch pin being located between the corresponding rigid pins and approximately in a plane defined by such rigid pins, each said latch pin having a transverse latching surface thereon facing inwardly toward the bar body for engaging behind a said support surface when the latch pin extends through a said intermediate hole and the latch is in the latching position, spring means acting between each latch and the corresponding fitting and biasing the corresponding said latch pin toward the latching position, each said latch pin being movable against the opposition of said spring means to the releasing position in which it can be projected into and withdrawn from a said intermediate hole, thereby enabling said fittings to be moved toward the respective said support surfaces to thereby project said rigid pins and said latch pins through the corresponding holes and to cause the latch pins to engage behind the corresponding said surfaces, and prevent withdrawal of the pins from the holes.

4. A cargo bracing bar for extending between and being supported at its ends in aligned series of substantially identical holes in spaced support surfaces, said bar comprising an elongated body having fittings adjacent the respective ends of the body and each of which have pairs of pins for entry into selected said holes to secure the bar in place, said body having at least one slide portion extending lengthwise of the body adjacent one end thereof, one of the fittings having a portion telescopically and slidably mounted on said slide portion, coengageable stop surfaces on said one fitting and body for limiting the telescopic movement of said one fitting on said slide portion, each of said fittings having a pair of laterally spaced pins rigid with the fitting and which project parallel to each other and to the length of the bar, said pins being adapted to extend into any selected spaced pair of said holes in a said support surface, a latch movably carried by one of said fittings for movement between latching and unlatching positions, said latch including a latch pin extending parallel to said rigid pins for entering when the latch is in unlatching position any said hole intermediate any said spaced pair of holes, said latch pin being located between the corresponding rigid pins and approximately in a plane defined by such rigid pins, each said latch pin having a transverse latching surface thereon facing inwardly toward the bar body for engaging behind said support surface when said rigid pins and said latch pin are projected through the corresponding holes and the latch is in latching position, and thereby prevent withdrawal of the pins from the holes.

5. A freight bracing system for holding articles of freight in stowed positions comprising spaced oppositely disposed surfaces, each of said surfaces being provided with patterns of holes which patterns are aligned on said spaced surfaces, each said pattern comprising three laterally spaced, parallel, substantially straight rows of regularly spaced holes, corresponding holes in respective rows lying in lines at right angles to the length of the rows, a freight bracing bar for extending between and being supported at its ends in aligned holes on said spaced surfaces, said bar comprising an elongated body having fittings adjacent the respective ends of the body and each of which has a pair of pins which enter selected pairs of said holes to secure the bar in place, the pins of each pair being rigid with the corresponding fitting and projecting parallel to each other and to the length of the bar and being located on opposite sides of the fitting, said pins being laterally spaced from each other by a distance equal to twice the distance between said rows and also equal to a multiple of the spacing between the holes in each row, so that each pair of pins can be inserted into corresponding holes in the outer ones of said three rows and can also be inserted in a pair of holes in each said row having at least one hole lying midway therebetween, at least one of said fittings having a latching lever pivoted thereon for movement about an axis transverse to the length of the bar, said lever including a handle portion and a patch pin extending parallel to the rigid pins on said one fitting and located approximately midway between the rigid pins on said one fitting and approximately in a plane defined by the rigid pins on said one fitting for entering an intermediate hole lying between the holes entered by said rigid pins, said latch pin having a transverse locking surface thereon facing toward the bar body for engaging behind a said surface when the latch pin extends through a said intermediate hole, spring means acting between the lever and said one fitting and biasing said latch pin to a position in which it partially but not completely registers with said intermediate hole when the rigid pins on said one fitting completely register with a said pair of holes, said latch pin being movable against the opposition of said spring means to a position in which it registers with a said intermediate hole thereby enabling said one fitting to be moved toward a said surface to project its rigid pins and said latch pin through the pair of holes and intermediate hole and enabling the transverse shoulder on the latch pin to engage behind a said surface and prevent withdrawal of the pins from said holes, said bar body having an elongated bore extending lengthwise thereof and opening out of one end thereof, at least one of said fittings having a portion telescopically mounted in said bore, and coengageable stop surfaces on said telescopically mounted fitting and said body for limiting the telescopic movement of the fitting in said bore.

6. A freight bracing system for holding articles of freight in stowed positions comprising spaced oppositely disposed surfaces, each of said surfaces being provided with patterns of holes which patterns are aligned on said spaced surfaces, each said pattern comprising three laterally spaced, parallel, substantially straight rows of regularly spaced holes, corresponding holes in said respective rows lying in lines at right angles to the length of the rows, a freight bracing bar for extending between and being supported at its ends in aligned holes on said spaced surfaces, said bar comprising an elongated body having fittings adjacent the respective ends of the body each of which has a pair of pins which enter selected pairs of said holes to secure the bar in place, the pins of each said pair being rigid with the corresponding fitting and projecting parallel to each other and to the length of the bar and being located on opposite sides of the fitting, said pins being laterally spaced from each other by a distance equal to twice the distance between said rows and also equal to a multiple of the spacing between the holes in each row, so that each pair of pins can be inserted into corresponding holes in the outer ones of said three rows and can also be inserted in a pair of holes in each said row having at least one hole lying midway therebetween, at least one of said fittings having a latch carried thereby for movement between latching and releasing positions and including a latch pin extending parallel to the rigid pins on said one fitting and located approximately midway between the rigid pins on said one fitting and approximately in a plane defined by the rigid pins on said one fitting for entering an intermediate hole lying between the holes entered by said rigid pins, said latch pin having a transverse locking surface thereon facing toward the bar body for engaging behind a said surface when the latch pin extends through a said intermediate hole, spring means acting between the latch and said one fitting and biasing said latch pin toward the latching position, said latch pin being movable against the opposition of said spring means to the releasing position in which it can be projected into and withdrawn from a said intermediate hole, thereby enabling said one fitting to be moved toward a said surface to project its rigid pins and said latch pin through the pair of holes and intermediate hole and enabling the transverse shoulder on the latch pin to engage behind a said surface and prevent withdrawal of the pins from said holes, said bar body having an elongated bore extending lengthwise thereof and opening out of one end thereof, at least one of said fittings having a portion telescopically mounted in said bore, and coengageable stop surfaces on said telescopically mounted fitting and said body for limiting the telescopic movement of the fitting in said bore.

7. A freight bracing system for holding articles of freight in stowed positions comprising spaced oppositely disposed surfaces, each of said surfaces being provided with patterns of holes which patterns are aligned on said spaced surfaces, each said pattern comprising three laterally spaced, parallel, substantially straight rows of regularly spaced holes, corresponding holes in said respective rows lying in lines at right angles to the length of the rows, a freight bracing bar for extending between and being supported at its ends in aligned holes on said spaced surfaces, said bar comprising an elongated body having fittings adjacent the respective ends of the body each of which has a pair of pins which enter selected pairs of said holes to secure the bar in place, the pins of each said pair being rigid with the corresponding fitting and projecting parallel to each other and to the length of the bar and being located on opposite sides of the fitting, said pins being laterally spaced from each other by a distance equal to twice the distance between said rows and also equal to a multiple of the spacing between the holes in each row, so that each pair of pins can be inserted into corresponding holes in the outer ones of said three rows and can also be inserted in a pair of holes in each said row having at least one hole lying midway therebetween, at least one of said fittings having a latch carried thereby for movement between latching and releasing positions and including a latch pin extending parallel to the rigid pins on said one fitting and located approximately midway between the rigid pins on said one fitting and approximately in a plane defined by the rigid pins on said one fitting and for entering an intermediate hole lying between the holes entered by said rigid pins, said latch pin having a transverse locking surface thereon facing toward the bar body for engaging behind a said surface when the latch pin extends through a said intermediate hole, spring means acting between the lever and said one fitting and biasing said latch pin toward the latching position, said latch pin being movable against the opposition of said spring means to the releasing position in which it can be projected into and withdrawn from a said intermediate hole, thereby enabling said one fitting to be moved toward a said surface to project its rigid pins and said latch pin through the pair of holes and intermediate hole and enabling the transverse shoulder on the latch pin to engage behind a said surface and prevent withdrawal of the pins from said holes.

8. A freight bracing bar for extending between and being secured at its ends in aligned series of holes in spaced support surfaces, said bar comprising an elongated body having fittings adjacent the respective ends of the body and each of which has a pair of pins for entry into selected said holes to secure the bar in place, said body having at least one elongated bore extending lengthwise of the body and opening out of one end thereof, one of the fittings having a portion telescopically mounted in said bore, coengageable stop surfaces on said one fitting and body for limiting the telescopic movement of said one fitting in said bore, the pins in each said pair being laterally spaced from each other, and rigid with the corresponding fitting and projecting parallel to each other, said pins of each pair being adapted to extend into spaced pairs of said holes in a said support surface, a latch carried by each said fitting for movement thereon between latching and releasing positions, each said latch including a latch pin extending generally parallel to the corresponding said rigid pins for entering a said hole intermediate a said spaced pair of holes, each said latch pin being located between the corresponding rigid pins and approximately in a plane defined by such rigid pins, each said latch pin having a transverse latching surface thereon for engaging behind a said support surface when the latch pin extends through a said intermediate hole and the latch pin is in the latching position, spring means acting between each latch and the corresponding fitting and biasing the corresponding said latch pin toward the latching position, each said latch pin being movable against the opposition of said spring means to the releasing position in which it can be projected into and withdrawn from a said intermediate hole, thereby enabling said fittings to be moved toward the respective said support surfaces to thereby project said rigid pins and said latch pins through the corresponding holes and to cause the latch pins to engage behind the corresponding said surfaces and prevent withdrawal of the pins from the holes.

9. A freight bracing bar for extending between and being secured at its ends in aligned series of substantially identical holes in spaced support surfaces, said bar comprising an elongated body having fittings adjacent the respective ends of the body and each of which have pairs of pins for entry into selected said holes to secure the bar in place, said body having at least one elongated bore extending lengthwise of the body and opening out of one end thereof, one of the fittings having a portion telescopically mounted in said bore, coengageable stop surfaces on said one fitting and body for limiting the telescopic movement of said one fitting in said bore, each of said fittings having a pair of laterally spaced pins rigid with the fitting and which project parallel to each other, said pins being adapted for entry into any selected spaced pair of said holes in a said support surface, a latch movably carried by one of said fittings for movement between latching and unlatching positions, said latch including a latch pin extending parallel to said rigid pins for entering when the latch is in unlatching position any said hole intermediate any said spaced pair of holes, said latch pin being located between the corresponding rigid pins and approximately in a plane defined by such rigid pins, each said latch pin having a transverse latching surface thereon for engaging behind said support surface when said rigid pins and said latch pin are projected through the corresponding holes and the latch is in latching position, and thereby prevent withdrawal of the pins from the holes.

10. A freight bracing bar for extending between and being secured at its ends in aligned series of holes in spaced support surfaces, said bar comprising an elongated body having fittings adjacent respective ends of the body and each of which has a pair of pins for entry into selected said holes to secure the bar in place, the pins of each said pair being laterally spaced from each other and rigid with the corresponding fitting and projecting parallel to each other, said pins of each pair being adapted to extend into spaced pairs of said holes in a said support surface, a latch carried by each said fitting for movement thereon between latching and releasing positions, each said latch including a latch pin extending parallel to the corresponding said rigid pins for entering a said hole intermediate a said spaced pair of holes, each said latch pin being located between the corresponding rigid pins and approximately in a plane defined by such rigid pins, each said latch pin having a transverse latching surface thereon for engaging behind a said support surface when the latch pin extends through a said intermediate hole and the latch is in the latching position, spring means acting between each latch and the corresponding fitting and biasing the corresponding said latch pin toward the latching position, each said latch pin being movable against the opposition of said spring means to a position in which it can be projected into and withdrawn from a said intermediate hole, thereby enabling said fittings to be moved toward the respective said support surfaces to thereby project said rigid pins and said latch pins through the corresponding holes and to cause the latch pins to engage behind the corresponding said surfaces, and prevent withdrawal of the pins from the holes.

11. A freight bracing bar for extending between and being secured at its ends in aligned series of substantially identical holes in spaced support surfaces, said bar comprising an elongated body having fittings adjacent the respective ends of the body and each of which have pairs of pins for entry into selected said holes to secure the bar in place, each of said fittings having a pair of laterally spaced pins rigid with the fitting and which project parallel to each other, said pins being adapted to extend into any selected spaced pair of said holes in a said support surface, a latch movably carried by one of said fittings for movement between latching and unlatching positions, said latch including a latch pin extending parallel to said rigid pins for entering when the latch is in unlatching position any said hole intermediate any said spaced pair of holes, said latch pin being located between the corresponding rigid pins and approximately in a plane defined by such rigid pins, each said latch pin having a transverse latching surface thereon for engaging behind said support surface when said rigid pins and said latch pin are projected through the corresponding holes and the latch is in latching position, and thereby prevent withdrawal of the pins from the holes.

12. A freight bracing system for holding articles of freight in stowed positions comprising spaced oppositely disposed surfaces, each of said surfaces being provided with patterns of holes which patterns are aligned on said spaced surfaces, each said pattern comprising three laterally spaced, parallel, substantially straight rows of regularly spaced holes, corresponding holes in said respective rows lying in lines at right angles to the length of the rows, a freight bracing bar extending between and being supported at its ends in aligned holes on said spaced surfaces, said bar comprising an elongated body having fittings adjacent the respective ends of the body and each of which has a pair of pins which enter selected pairs of said holes to secure the bar in place, the pins of each said pair being rigid with the corresponding fitting and projecting parallel to each other and being located on opposite sides of the fitting, said pins being laterally spaced from each other by a distance equal to twice the distance between said rows and also equal to a multiple of the spacing between the holes in each row, so that each pair of pins can be inserted into corresponding holes in the outer ones of said three rows and can also be inserted in a pair of holes in each said row having at least one hole lying midway therebetween, at least one of said fittings having a latch carried thereby for movement between latching and releasing positions and including a latch pin extending parallel to the rigid pins on said one fitting and located approximately midway between the rigid pins on said one fitting and approximately in a plane defined by the rigid pins on said one fitting for entering an intermediate hole lying between the holes entered by said rigid pins, said latch pin having a transverse locking surface thereon for engaging behind a said surface when the latch pin extends through a said intermediate hole, spring means acting between the latch and said one fitting and biasing said latch pin toward the latching position, said latch pin being movable against the opposition of said spring means to the releasing position in which it can be projected into and withdrawn from a said intermediate hole, thereby enabling said one fitting to be moved toward a said surface to project its rigid pins and said latch pin through the pair of holes and intermediate hole and enabling the transverse shoulder on the latch pin to engage behind a said surface and prevent withdrawal of the pins from said holes, said bar body having an elongated bore extending lengthwise thereof and opening out of one end thereof, at least one of said fittings having a portion telescopically mounted in said bore, and coengageable stop surfaces on said telescopically mounted fitting and said body for limiting the telescopic movement of the fitting in said bore.

13. A freight bracing system for holding articles of freight in stowed positions comprising spaced oppositely disposed surfaces, each of said surfaces being provided with patterns of holes which patterns are aligned on said spaced surfaces, and each said pattern comprising three laterally spaced, parallel, substantially straight rows of regularly spaced holes, corresponding holes in said respective rows lying in lines at right angles to the length of the rows, a freight bracing bar extending between and being supported at its ends in aligned holes on said spaced surfaces, said bar comprising an elongated body having fittings adjacent the respective ends of the body each of which has a pair of pins which enter selected pairs of said holes to secure the bar in place, the pins of each said pair being rigid with the corresponding fitting and projecting parallel to each other and being located on opposite sides of the fitting, said pins being laterally spaced from each other by a distance equal to twice the distance between said rows and also equal to a multiple of the spacing between the holes in each row, so that each pair of pins can be insertd into corresponding holes in the outer ones of said three rows and can also be inserted in a pair of holes in each said row having at least one hole lying midway therebetween, at least one of said fittings having a latching lever carried thereby for movement between latching and releasing positions including a latch pin extending parallel to the rigid pins on said one fitting and located approximately midway between the rigid pins on said one fitting and approximately in a plane defined by the rigid pins on said one fitting for entering an intermediate hole lying between the holes entered by said rigid pins, said latch pin having a transverse locking surface thereon for engaging behind a said surface when the latch pin extends through a said intermediate hole, spring means acting between the lever and said one fitting and biasing said latch pin toward the latching position, said latch pin being movable against the opposition of said spring means to the releasing position in which it can be projected into and withdrawn from a said intermediate hole, thereby enabling said one fitting to be moved toward a said surface to project its rigid pins and said latch pin through the pair of holes and intermediate hole and enabling the transverse shoulder on the patch pin to engage behind a said surface and prevent withdrawal of the pins from said holes.

14. A freight bracing bar for extending between and being supported at its ends in holes in spaced support surfaces, said bar comprising an elongated body having attachment means adjacent respective ends of the body for entry into selected said holes to secure the bar in place, at least one of said attachment means comprising three laterally spaced pins which project outwardly from the body and parallel to each other and lie in substantially a common plane, said pins being adapted to extend into spaced holes in a said support surface, at least one of said three pins being movable and constituting a latch pin and having a transverse locking surface thereon for engaging behind said support surface when the latch pin extends through a hole, spring means acting against the latch pin to bias it to a position in which it partially but not not completely registers with a hole when at least one of the other pins completely registers with a hole, said latch pin being movable against the opposition of said spring means to a position in which it registers with its said hole, thereby enabling said bar to be moved toward said surface to thereby project said pins through said holes and to cause the latch pin to engage behind the said surface and prevent withdrawal of the pins from the holes.

15. A freight bracing member for extending between and attachment to spaced support structures at least one of which has a row of holes therein comprising a body having a longitudinal axis, means adjacent at least one end of the body selectively engageable and disengageable with said support structure so as to transmit loads on the member into the support structure and prevent inadvertent removal of the member from the support structure, said means comprising three pins projecting from the body for extending simultaneously into separate said holes in the said support structure, two of said pins being fixed against pivotal movement in all directions transverse to said longitudinal axis, the other of said pins being a latch pin movable with respect to said axis between a retracted position and a latching position, said movable pin having a latching surface thereon for engaging behind said support structure when said movable pin extends through one said hole in said structure and said movable pin is in said latching position, yieldable means biasing said movable pin to said latching position in which it partially but not completely registers with said one hole when the fixed pins completely register with two other said holes, said movable pin being movable against the opposition of said yieldable means to said retracted position in which it registers with said one hole, and common means mounting said three pins on said body for telescopic movement parallel to said longitudinal axis.

16. A freight bracing bar for attachment to a support structure having at least three holes therein comprising an elongated body having a longitudinal axis, means adjacent at least one end of the body selectively engageable and disengageable with said support structure so as to transmit loads on the bar into the support structure and prevent inadvertent removal of the bar from the support structure, said means comprising three pins projecting from the body for extending simultaneously into separate said holes in said support structure, two of said pins being fixed against pivotal movement in all directions transverse to said longitudinal axis, the other of said pins being a latch pin movable with respect to said axis between a retracted position and a latching position, said movable pin having a latching surface thereon for engaging behind said support structure when said movable pin extends through one said hole in said structure and said movable pin is in said latching position, and yieldable means biasing said movable pin to said latching position in which it partially but not completely registers with said one hole when the fixed pins completely register with two other said holes, said movable pin being movable against the opposition of said yieldable means to said retracted position in which it registers with said one hole.

17. A freight bracing member for extending between and attachment to each of a pair of spaced support structures at least one of which has at least three spaced holes therein comprising an elongated body having a longitudinal axis, means adjacent one end of the body selectively engageable and disengageable with said one support structure so as to transmit loads on the member into said one support structure and prevent inadvertent removal of the member therefrom, said means comprising three pins projecting from the body for simultaneously extending into and occupying said three holes in said one support structure when the member is attached to said one structure, two of the pins being fixed against pivotal movement in all directions transverse to said longitudinal axis, the other of the pins lying between the two pins and being a latch pin movable with respect to said axis between a retracted position and a latching position, the movable pin having a latching surface thereon for engaging behind said one support structure when the movable pin extends through a said hole in said one structure and the movable pin is in said latching position, and yieldable means biasing the movable pin to its latching position in which it partially but not completely registers with said last mentioned hole when the fixed pins completely register with two other said holes, the movable pin being movable against the opposition of the yieldable means to said retracted position in which it registers with a said one hole, and means adjacent the other end of the member for connecting the other end thereof to the other support structure to transmit loads from the member into said other support structure.

References Cited in the file of this patent

UNITED STATES PATENTS

| Number | Name | Date |
|---|---|---|
| Re. 20,697 | Thomas | Apr. 12, 1938 |
| Re. 20,860 | Thomas | Sept. 13, 1938 |
| Re. 24,118 | Fahland | Feb. 7, 1956 |
| 408,364 | Traut | Aug. 6, 1889 |
| 1,197,375 | Hoff | Sept. 5, 1916 |
| 1,241,841 | French | Oct. 2, 1917 |
| 1,280,670 | Cornell | Oct. 8, 1918 |
| 1,631,304 | Willoughby | June 7, 1927 |
| 1,665,439 | Brown | Apr. 10, 1928 |
| 1,691,639 | Charlebois et al. | Nov. 13, 1928 |
| 1,757,866 | Johnson | May 6, 1930 |
| 1,833,764 | Tremblay et al. | Nov. 24, 1931 |
| 1,854,711 | Mayer | Apr. 19, 1932 |
| 1,891,588 | Claus | Dec. 20, 1932 |
| 1,909,178 | Hudson | May 16, 1933 |
| 2,017,301 | Wynn | Oct. 15, 1935 |
| 2,038,692 | Thomas | Apr. 28, 1936 |
| 2,056,704 | Anderson | Oct. 6, 1936 |
| 2,070,970 | Engblom | Feb. 16, 1937 |
| 2,091,869 | McCurdy | Aug. 31, 1937 |
| 2,127,044 | Mutchler, Sr. | Aug. 16, 1938 |
| 2,160,870 | Jones | June 6, 1939 |
| 2,252,283 | Brase | Aug. 12, 1941 |
| 2,283,309 | Bean et al. | May 19, 1942 |
| 2,294,795 | Moses | Sept. 1, 1942 |
| 2,354,861 | Hermann | Aug. 1, 1944 |
| 2,372,904 | McCarthy | Apr. 3, 1945 |
| 2,497,683 | Nampa et al. | Feb. 14, 1950 |
| 2,513,348 | Nampa | July 4, 1950 |
| 2,519,846 | Nampa | Aug. 22, 1950 |
| 2,546,929 | Nampa | Mar. 27, 1951 |
| 2,563,994 | Dougherty | Aug. 14, 1951 |
| 2,575,550 | Fahland | Nov. 20, 1951 |
| 2,592,666 | Doherty | Apr. 15, 1952 |
| 2,593,174 | O'Dell | Apr. 15, 1952 |
| 2,608,420 | Eck | Aug. 26, 1952 |
| 2,614,781 | Engel | Oct. 21, 1952 |
| 2,616,375 | Nampa | Nov. 4, 1952 |
| 2,627,821 | Sjorgren | Feb. 10, 1953 |
| 2,638,375 | Jewell | May 12, 1953 |
| 2,659,319 | Herman | Nov. 17, 1953 |
| 2,673,530 | Stough | Mar. 30, 1954 |
| 2,679,214 | Nampa | May 25, 1954 |
| 2,762,514 | McGinn | Sept. 11, 1956 |
| 2,747,520 | Brown, Jr. et al. | May 29, 1956 |